US012747114B2

(12) United States Patent
Chen et al.

(10) Patent No.: US 12,747,114 B2
(45) Date of Patent: Sep. 29, 2026

(54) PUSHING MECHANISM AND DETECTION SYSTEM

(71) Applicants: Tsinghua University, Beijing (CN); NUCTECH COMPANY LIMITED, Beijing (CN)

(72) Inventors: Zhiqiang Chen, Beijing (CN); Li Zhang, Beijing (CN); Liang Li, Beijing (CN); Mingzhi Hong, Beijing (CN); Zinan Wang, Beijing (CN); Lei Xie, Beijing (CN)

(73) Assignees: Tsinghua University, Beijing (CN); NUCTECH COMPANY LIMITED, Beijing (CN)

( * ) Notice: Subject to any disclaimer, the term of this patent is extended or adjusted under 35 U.S.C. 154(b) by 62 days.

(21) Appl. No.: 18/840,372

(22) PCT Filed: Dec. 25, 2023

(86) PCT No.: PCT/CN2023/141505
§ 371 (c)(1),
(2) Date: Aug. 21, 2024

(87) PCT Pub. No.: WO2024/140551
PCT Pub. Date: Jul. 4, 2024

(65) Prior Publication Data

US 2025/0187851 A1 Jun. 12, 2025

(30) Foreign Application Priority Data

Dec. 28, 2022 (CN) ......................... 202211698156.2

(51) Int. Cl.
*B65G 47/82* (2006.01)

(52) U.S. Cl.
CPC .................................... *B65G 47/82* (2013.01)

(58) Field of Classification Search
CPC ................................ B65G 47/82; G01D 11/00
See application file for complete search history.

(56) References Cited

U.S. PATENT DOCUMENTS 3,595,365 A * 7/1971 Faure ..................... B65G 47/82
65/260
3,595,367 A * 7/1971 Faure ...................... C03B 9/453
222/394

(Continued)

FOREIGN PATENT DOCUMENTS

CN 212892602 U * 4/2021
CN 216470730 U * 5/2022

(Continued)

OTHER PUBLICATIONS

English Translation of International Search Report mailed on Mar. 23, 2024 for International Patent Application PCT/CN2023/141505 (3 pages).

(Continued)

*Primary Examiner* — Gene O Crawford
*Assistant Examiner* — Abby A Jorgensen
(74) *Attorney, Agent, or Firm* — Merchant & Gould P.C.

(57) ABSTRACT

A pushing mechanism and an inspection system are provided. The pushing mechanism includes a position-changing device (10), a driving device (20) and a guide device (30). The position-changing device includes a main plate (11) and a pushing element (12) movably disposed on a side of the main plate. The driving device is connected to the main plate and configured to drive the position-changing device to move. After the guide device is in contact with the pushing element, the pushing element may switch between a first state and a second state. A highest point of the pushing element in the first state is higher than a highest point of the pushing element in the second state.

12 Claims, 5 Drawing Sheets

Front ⟷ Back

(56) References Cited

U.S. PATENT DOCUMENTS

| | | | | |
|---|---|---|---|---|
| 3,708,052 | A * | 1/1973 | Faure | B65G 47/82 198/468.01 |
| 5,277,294 | A * | 1/1994 | Sherepa | B65G 47/82 198/429 |
| 6,837,359 | B1 * | 1/2005 | Bessette | B65G 47/82 198/457.07 |
| 2021/0274667 | A1 * | 9/2021 | Lin | H05K 7/1401 |

FOREIGN PATENT DOCUMENTS

| | | | | | |
|---|---|---|---|---|---|
| CN | 216862863 | U | * | 7/2022 | |
| CN | 116767826 | A | | 9/2023 | |
| EP | 0391301 | A1 | | 10/1990 | |
| JP | H07242328 | A | | 9/1995 | |
| JP | 2000031168 | A | * | 1/2000 | |
| KR | 20060031746 | A | * | 4/2006 | B65G 47/82 |

OTHER PUBLICATIONS

First Office Action issued on Nov. 25, 2023 for Chinese Patent Application No. 202211698156.2 (14 pages including English Translation).

Second Office Action issued on Mar. 2, 2024 for Chinese Patent Application No. 202211698156.2 (13 pages including English Translation).

* cited by examiner

PUSHING MECHANISM AND DETECTION SYSTEM

CROSS-REFERENCE TO RELATED APPLICATIONS

This application is a Section 371 National Stage Application of International Application No. PCT/CN2023/141505, filed on Dec. 25, 2023, and which claims priority to Chinese Patent Application No. 202211698156.2, filed on Dec. 28, 2022, and the contents of which are incorporated herein by reference in their entireties.

TECHNICAL FIELD

The present disclosure relates to a field of inspection device, in particular to a pushing mechanism and an inspection system.

BACKGROUND

In an inspection device, an object may be pushed to an inspection position through a pushing mechanism. The inspection device inspects the object to determine whether the object is qualified. When the object is conveyed to a front of the pushing mechanism, the pushing mechanism may push the object and correct a position of the object, so as to ensure the inspection effect. In the related art, the pushing mechanism may rotate. When the object is conveyed from a back of the pushing mechanism to the front of the pushing mechanism and is in contact with the pushing mechanism, the pushing mechanism rotates at a certain angle. At this time, the pushing mechanism may avoid interference on a conveying path of the object, so that the object may pass horizontally above the pushing mechanism. When the object is moved to the front of the pushing mechanism, the pushing mechanism may rotate back to an initial position under the own gravity of the pushing mechanism, and at this time, the pushing mechanism may move forward to push and correct the position of the object. The object may only move forward from the back of the pushing mechanism, and will be obstructed when moving backward from the front of the pushing mechanism. When inspecting the object, if the inspection successes, the object may continue to move forward. If the inspection fails, the object needs to be returned. At this time, the object is obstructed by the pushing mechanism, and it is impossible to complete the return operation.

SUMMARY

According to embodiments of the present disclosure, a pushing mechanism includes a position-changing device, a driving device and a guide device. The position-changing device includes a main plate and a pushing element movably disposed on a side of the main plate. The driving device is connected to the main plate and is configured to drive the position-changing device to move. After the guide device is in contact with the pushing element, the pushing element is allowed to switch between a first state and a second state. A highest point of the pushing element in the first state is higher than a highest point of the pushing element in the second state.

In some embodiments, a mode of motion of the pushing element switching from the first state to the second state is moving, rotating, or a combination of moving and rotating.

In some embodiments, the guide device includes a guide groove. A guide rod is provided on the pushing element. The guide rod drives the pushing element to move under a guiding of the guide groove.

Furthermore, the pushing element is rotatably connected to the main plate through a shaft. The pushing element includes a first edge and a first corner adjacent to the first edge. A distance between the first corner and the shaft is greater than a vertical distance between the first edge and the shaft.

Optionally, a counterweight block is provided on the pushing element. The counterweight block and the first corner are located on two sides of an axis of the shaft in a horizontal direction respectively, so that the pushing element has a trend of maintaining in the first state.

Furthermore, a positioning block is provided on the main plate. A positioning portion is provided on a side surface opposite to the counterweight block on the pushing element. When the pushing element is in the first state, the positioning portion abuts against the positioning block.

In some embodiments, a surface of the guide groove is a curved surface. The curved surface includes a lower section, a middle section and an upper section which are sequentially connected. A slope of the middle section is greater than a slope of the lower section. An angle between the upper section and the middle section is less than or equal to 90 degrees.

Furthermore, the slope of the lower section gradually increases from bottom to top of the lower section.

In some embodiments, the driving device and the main plate are connected in an articulated manner.

Optionally, the driving device and the main plate are connected through a spherical joint.

In some embodiments, one of the driving device and the main plate is provided with a groove, and the other one of the driving device and the main plate is provided with a plate-shaped portion horizontally inserted into the groove. A pin vertically passes through the groove and the plate-shaped portion. An interval is provided between a front edge of the plate-shaped portion and a rear of the groove.

In some embodiments, the pushing element is movably connected to the main plate.

Furthermore, the guide device includes a slide rail having a lifting and lowering stroke. A sliding block slidable along the slide rail is provided on the pushing element.

Optionally, the slide rail is in contact with the slide block in an upper surface and a lower surface, and is configured to guide the slide block to be lifted and lowered as moving along the slide rail.

In some embodiments, the slide rail is in contact with an upper surface of the slide block. The position-changing device includes a reset element configured to apply an upward force to the pushing element, so that the slide block is lifted and lowered as moving along the slide rail through a combined force of the slide rail and the reset element.

According to an inspection system of a second embodiment of the present disclosure, the inspection system includes a pushing mechanism as described in any of the above embodiments, a conveying mechanism and an inspection mechanism. The pushing mechanism pushes an object on the conveying mechanism to an inspection position. The inspection mechanism is configured to inspect the object at the inspection position.

Additional aspects and advantages of the present disclosure will be provided in part in the following description, and in part will become obvious from the following description, or will be learned through practice of the present disclosure.

BRIEF DESCRIPTION OF THE DRAWINGS

The above-mentioned and/or additional aspects and advantages of the present disclosure will be obvious and easy to understand from the description of embodiments in conjunction with the following drawings, in which.

Figure 1:
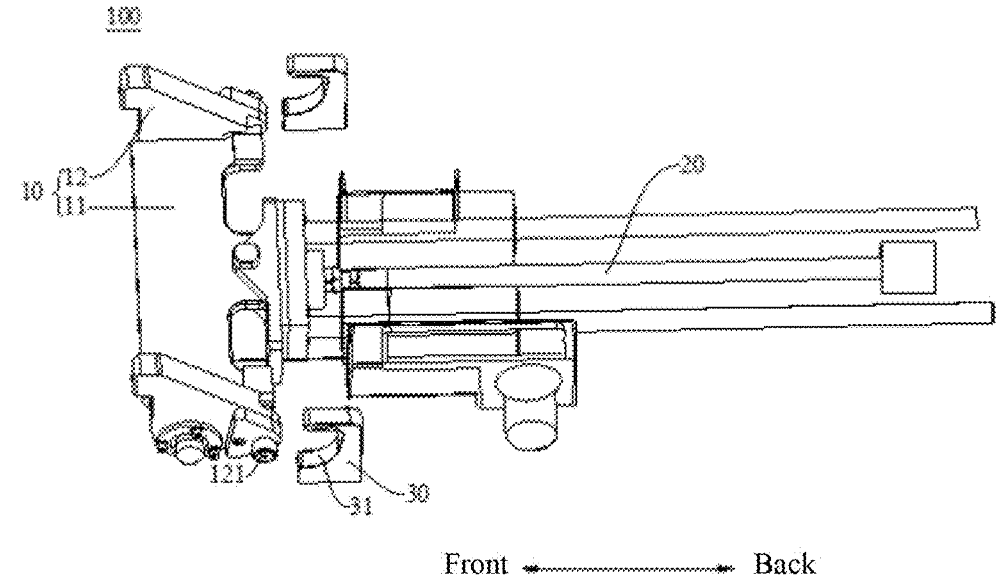
FIG. 1 is a three-dimensional schematic diagram of a pushing mechanism of an embodiment of the present disclosure.

REFERENCES NUMERALS pushing mechanism 100,
position-changing device 10,
main plate 11, plate-shaped portion 111, positioning block 112,
pushing element 12, positioning portion 120, guide rod 121, rolling
bearing 122, shaft 123, first edge 124, first corner 125, counterweight block 126, slide groove 127, slide block 128, reset element 129, driving device 20,
groove 21,
pin 22,
guide device 30,
guide groove 31, lower section 311, middle section 312, upper section 313,
slide rail 32.

DETAILED DESCRIPTION OF EMBODIMENTS

Embodiments of the present disclosure are described in detail below, examples of which are shown in the accompanying drawings, where same or similar reference numerals throughout represent the same or similar elements or elements having the same or similar functions. The embodiments described below with reference to the accompanying drawings are exemplary and are only used to explain the present disclosure, and may not be understood as limiting the present disclosure.

In the description of the present disclosure, it should be understood that orientations or position relationships indicated by the terms "center", "longitudinal", "lateral", "length", "width", "thickness", "upper", "lower", "front", "back", "left", "right", "vertical", "horizontal", "top", "bottom", "inside", "outside", "clockwise", "counterclockwise", "axial", "radial", "peripheral", etc. are based on the orientations or position relationships shown in the drawings, and are only for the convenience of describing the present disclosure and simplifying the description, rather than indicating or implying that the device or element referred to must have a specific orientation, be constructed and operated in a specific orientation, therefore it may not be understood as a limitation on the present disclosure. In addition, features limited to "first" and "second" may explicitly or implicitly include one or more of these features. In the description of the present disclosure, unless otherwise specified, the meaning of "plurality of" is two or more.

In the description of the present disclosure, it should be noted that unless otherwise specified and limited, the terms "mounted", "connected" and "connection" should be broadly understood. For example, it may be a fixed connection, a detachable connection, or an integrated connection. It may be a mechanical connection or an electrical connection. It may be directly connected, or indirectly connected through an intermediate medium. It may be an internal connection between two elements. For those of skill in the art, specific meanings of the terms described above in the present disclosure may be understood based on specific circumstances.

The present disclosure proposes a pushing mechanism. The pushing mechanism may avoid interference on a conveying path of the object when an inspection of the object fails, so that a return operation may be completed by an inspection device, thereby improving the inspection efficiency of the inspection device.

According to the pushing mechanism of embodiments of the present disclosure, a position-changing device is connected to a driving device through a main plate. A pushing element on the position-changing device may be in contact with a guide device which may guide the pushing element. The driving device may drive the position-changing device, so that the pushing element of the position-changing device is in contact with the guide device, and may drive the pushing element to switch between a first state and a second state. When the pushing element is in the first state, the pushing element may push the object in front of the pushing element, so as to complete the inspection of the object by the inspection device. When the inspection fails, the object is returned. At this time, the driving device may drive the position-changing device, so that the pushing element switches from the first state to the second state under a guiding of the guide device, so as to avoid interference on a movement trajectory of the object. Therefore, when the inspection device inspects the object, the pushing mechanism may push the object and correct a position of the object. After the inspection fails, the pushing mechanism may avoid interference, so as to complete a return operation of the object by the inspection mechanism, thereby improving the inspection efficiency.

The present disclosure also aims to propose an inspection system. The inspection system includes a pushing mechanism as described above, which may improve the inspection efficiency.

According to an inspection system of a second embodiment of the present disclosure, through providing the above-mentioned pushing mechanism in the inspection system, the object may be returned by a conveying mechanism after the inspection of the object fails. The pushing mechanism may avoid interference on a return path of the object, thereby improving the inspection efficiency of the inspection system.

With reference to FIG. 1 to FIG. 10, the pushing mechanism 100 according to the embodiments of the present disclosure will be described below.

Figure 2:
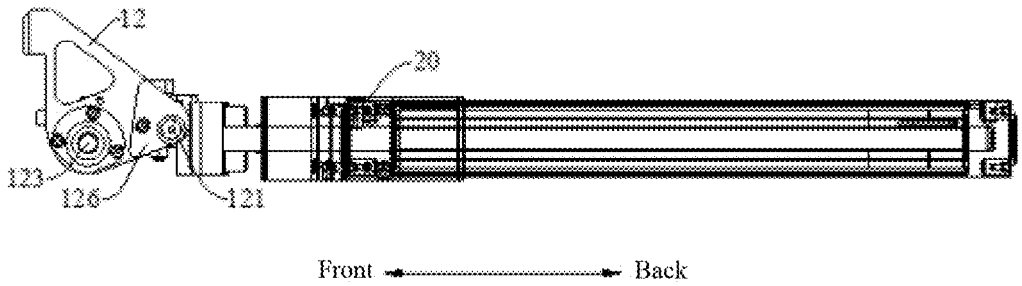
FIG. 2 is a main view of a pushing element of a pushing mechanism in a first state of an embodiment of the present disclosure.
Figure 3:
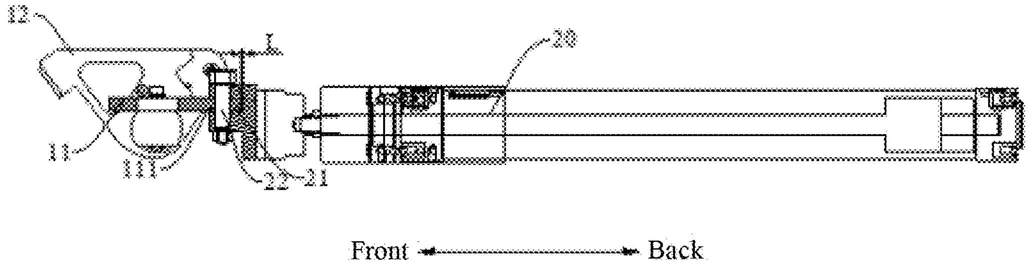
FIG. 3 is a main view of a pushing element of a pushing mechanism in a second state of an embodiment of the present disclosure.

As shown in FIG. 1 to FIG. 3, the pushing mechanism 100 according to the embodiments of the present disclosure includes a position-changing device 10, a driving device 20 and a guide device 30.

The position-changing device 10 includes a main plate 11 and pushing elements 12 movably disposed on both sides of the main plate 11. The driving device 20 is connected to the main plate 11 and is configured to drive position-changing device 10 to move. After the guide device 30 is in contact with the pushing element 12, the pushing element 12 may be allowed to switch between a first state and a second state. A highest point of the pushing element 12 in the first state is higher than a highest point of the pushing element 12 in the second state.

Specifically, the position-changing device 10 is connected to the driving device 20 through the main plate 11. The pushing element 12 on the position-changing device 10 may be in contact with the guide device 30 which may guide the pushing element 12. The driving device 20 may drive the position-changing device 10 to move, so that the pushing element 12 of the position-changing device 10 is in contact with the guide device 30, and may drive the pushing element 12 to switch between the first state and the second state. As shown in FIG. 2, when the pushing element 12 is in the first state, the pushing element 12 may push the object in front of the pushing element 12, so as to complete the inspection of the object by the inspection device. When the inspection fails, the object is returned. At this time, the driving device 20 may drive the position-changing device 10, so that the pushing element 12 switches from the first state to the second state under the guiding of the guide device 30, as shown in FIG. 3, so as to avoid interference on the movement trajectory of the object.

For example, the pushing mechanism 100 is disposed in the inspection system. The inspection system also has a conveying device and an inspection device. Two guide rails are provided on the conveying device. The guide rails may transmit objects. The pushing mechanism 100 is disposed in an interval between the two guide rails. The driving device 20 is fixed relative to the conveying device. The driving device 20 drives the pushing element 12 to switch states. A highest point of the pushing element 12 in the first state is higher than upper surfaces of the guide rails. A highest point of the pushing element 12 in the second state is lower than the upper surfaces of the guide rails. Therefore, the pushing element 12 in the first state may push the object through a part of the pushing element 12 higher than the upper surfaces of the guide rails, so as to convey the object to an inspection position. When the pushing element 12 is in the second state, since the highest point of the pushing element 12 is lower than the upper surfaces of the guide rails, the pushing element 12 may avoid interference on the return path of the object, thereby improving the inspection efficiency.

According to the pushing mechanism 100 of the embodiments of the present disclosure, when the inspection device inspects the object, the pushing mechanism 100 may push the object and correct the position of the object. After the inspection fails, the pushing element 12 may switch to the second state under a driving of the driving device 20. At this time, the highest point of the pushing element 12 is lower than a lower surface of the object, and the pushing mechanism 100 may avoid interference on the return path of the object, so that the return operation of the object may be completed by the inspection mechanism, thereby improving the inspection efficiency.

Optionally, the pushing mechanism 100 is disposed above the inspection system. The driving device 20 is disposed higher than the inspection system through a gantry. The position-changing device 10 is connected to the driving device 20 and extends downwards from the driving device 20. The position-changing device 10 has pushing elements 12. A lowest point of the pushing element 12 in the first state is lower than a top surface of the object, and a lowest point of the pushing element 12 in the second state is higher than the top surface of the object.

Specifically, the driving device 20 is fixed by a gantry, so that the pushing mechanism 100 is disposed higher than the inspection system. The position-changing device 10 may selectively push the object by the pushing element 12 through extending downwards. When the pushing element 12 is in the first state, the lowest point of the pushing element 12 is lower than the top surface of the object. At this time, under the driving of the driving device 20, the pushing element may push the object, so as to convey the object to the inspection position. When the inspection of the object fails, the pushing element 12 switches to the second state. At this time, the lowest point of the pushing element 12 is higher than the top surface of the object. The driving element 12 may avoid interference on the return path of the object, thereby improving the inspection efficiency.

As shown in FIG. 1, in some embodiments, the guide device 30 includes a guide groove 31. A guide rod 121 is provided on the pushing element 12. The guide rod 121 may drive the pushing element 12 to move under a guiding of the guide groove 31.

Specifically, when the driving device 20 drives the position-changing device 10 to allow the pushing element 12 to switch states, the guide rod 121 is first in contact with the guide groove 31. Then, under the guiding of the guide groove 31, the guide rod 121 may move according to a shape of the guide groove 31. Finally, the pushing element 12 is allowed to switch from the first state to the second state or from the second state to the first state. When the pushing element 12 switches states, the guide rod 121 always maintains in contact with the guide groove 31, and the guide groove 31 may constrain the movement trajectory of the guide rod 121.

Therefore, through a cooperation between the guide rod 121 and the guide groove 31, the switching of the pushing element 12 between the first state and the second state may be more stable, thereby improving the reliability of the pushing mechanism 100.

Figure 5:
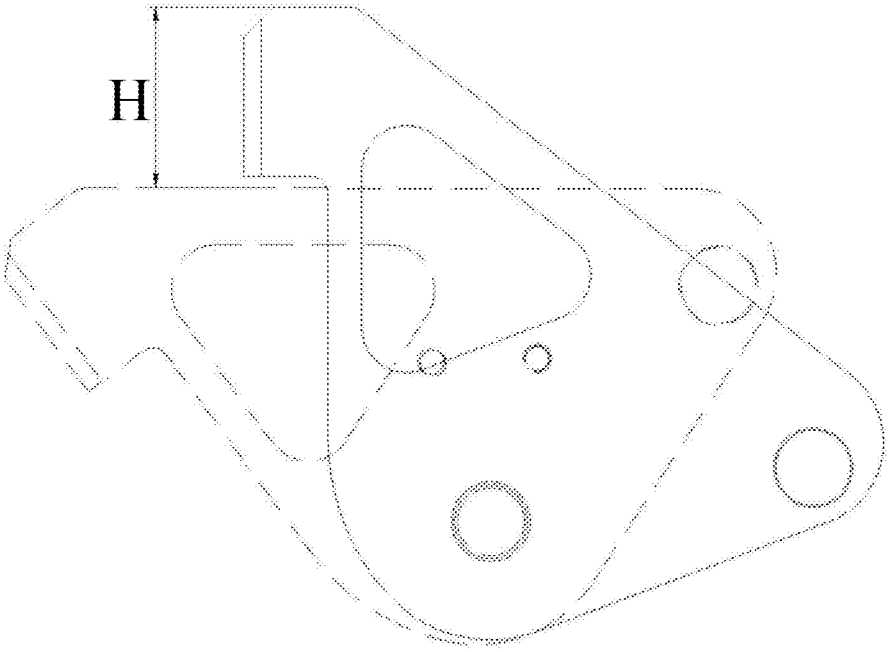
FIG. 5 is a comparison diagram of a pushing element of a pushing mechanism in a first state and a second state of an embodiment of the present disclosure.

As shown in FIG. 5, optionally, the pushing element 12 also includes a rolling bearing 122. The rolling bearing 122 is sleeved outside the guide rod 121. When the guide rod 121 on the pushing element 12 is matched with the guide groove 31 on the guide device 30, the rolling bearing 122 sleeved outside the guide rod 121 may be in contact with the guide groove 31. When the pushing element 12 switches between the first state and the second state, the rolling bearing 122 may roll in the guide groove 31, so as to reduce a frictional resistance between the pushing element 12 and the guide device 30, and cause the movement of the pushing element 12 to be smoother, thereby improving the reliability of the pushing mechanism 100.

It should be noted that rollers may also be sleeved outside the guide rod 121 or lubricating grease may be applied between the guide rod 121 and the guide groove 31. There are no specific restrictions here, and the selection may be made according to actual requirements.

Figure 4:
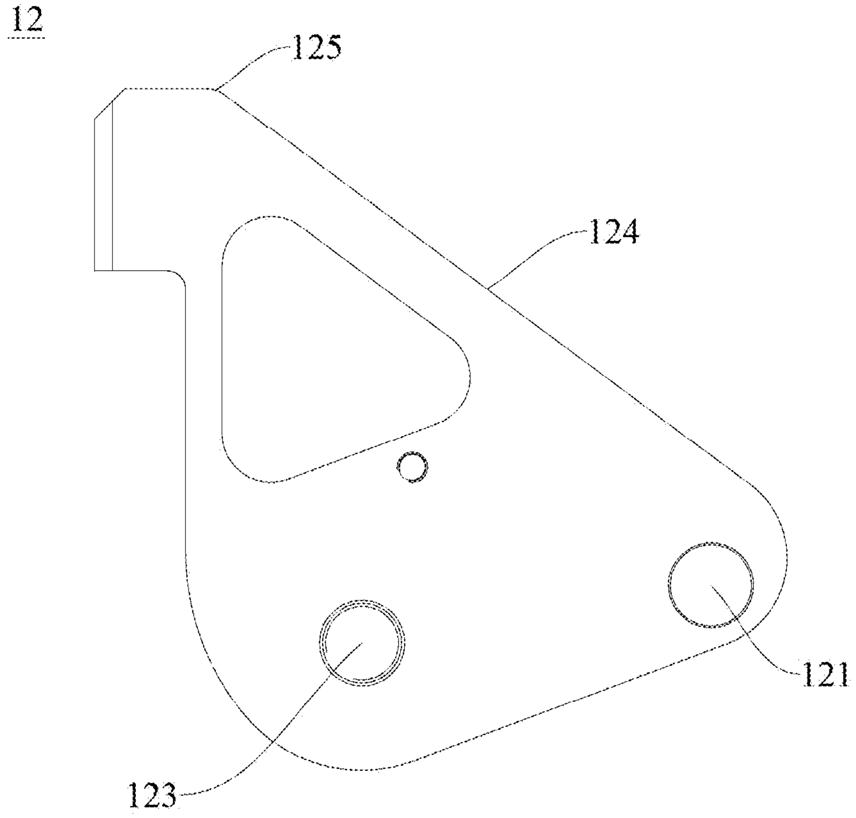
FIG. 4 is a main view of a pushing element of a pushing mechanism of an embodiment of the present disclosure.

As shown in FIG. 4 to FIG. 5, furthermore, the pushing element 12 is rotatably connected to the main plate 11 through a shaft 123. The pushing element 12 includes a first edge 124 and a first corner 125 adjacent to the first edge 124. A distance between the first corner 125 and the shaft 123 is greater than a vertical distance between the first edge 124 and the shaft 123.

Specifically, the pushing element 12 is fixed on the main plate 11 through the shaft 123, and the pushing element 12 may rotate relative to the main plate 11. When the pushing element 12 is in the first state, the highest point of the pushing element 12 is located at the first corner 125. When the pushing element 12 is in the second state, the highest point of the pushing element 12 is located on the first edge 124. As shown in FIG. 5. a difference between the highest point of the pushing element 12 in the first state and the highest point of the pushing element 12 in the second state is H.

That is to say, when the pushing element 12 moves from the first state to the second state, the driving device 20 first drives the position-changing device 10, and the driving device 20 drives the main plate 11 to move synchronously. The pushing element 12 rotates relative to the main plate 11 under a constraint of the shaft 123. When the pushing element 12 switches from the first state to the second state, a height of the highest point of the pushing element 12 changes in a direction perpendicular to the main plate 11, and a distance between the first corner 125 and the shaft 123 is greater than a vertical distance between the first edge 124 and the shaft 123.

Therefore, the highest point of the pushing element 12 in the second state is lower than the highest point of the pushing element 12 in the first state. At this time, the pushing element 12 may avoid interference on the conveying path of the object, so as to complete the return operation by the inspection device, thereby improving the inspection efficiency of the inspection device.

Figure 6:
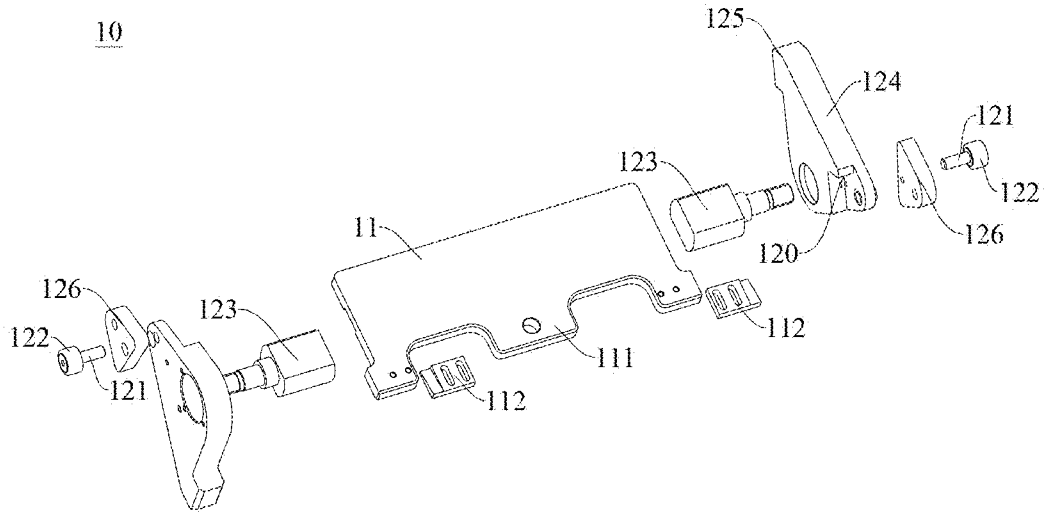
FIG. 6 is an exploded view of a position-changing device of a pushing mechanism of an embodiment of the present disclosure.

As shown in FIG. 6, optionally, a counterweight block 126 is provided on the pushing element 12. The counterweight block 126 and the first corner 125 are located on two sides of an axis of the shaft 123 in a horizontal direction respectively, so that the pushing element 12 has a trend of maintaining in the first state. The counterweight block 126 and the pushing element 12 may be an integrated structure or the counterweight block 126 may be fixed on the pushing element 12 through a connecting device.

Specifically, in the horizontal direction, the first corner 125 and the counterweight block 126 are located on two sides of the axis of the shaft 123. When the pushing element 12 is connected to the main plate 11 through the shaft 123, a center of gravity of the pushing element 12 is located on a side of the axis of the shaft 123 biased towards the counterweight block 126. In an absence of external interference, the pushing element 12 will rotate towards a side of the counterweight block 126, so that the pushing element 12 maintains in the first state. At this time, the first corner 125 is the highest point of the pushing element 12 in the first state.

As shown in FIG. 2 and FIG. 4, for example, the pushing element 12 may be formed as a triangular block. The shaft 123 is disposed at one of corners of the triangular block, the first corner 125 and the counterweight block 126 are disposed at another two corners of the triangular block respectively, and the edge connecting the first corner 125 and the corner where the counterweight block 126 is located is the first edge 124. The pushing element 12 may rotate freely along the shaft 123. Under an action of gravity of the counterweight block 126, the pushing element 12 may have a trend of clockwise rotation. The highest point of the pushing element 12 is located at the first corner 125. At this time, the pushing element 12 is in the first state.

When the object is pushed by the pushing mechanism 100, the object is located in front of the pushing mechanism 100, and the pushing element 12 is in the first state. The driving device 20 drives the position-changing device 10 to move forward, and the pushing element 12 may push the object forward for inspection. The pushing element 12 abuts against the object, so that the pushing element 12 always maintains in the first state. When the inspection of the object fails, the object needs to be returned. At this time, the driving device 20 drives the position-changing device 10 to move backward, under the guiding of the guide device 30, the pushing element 12 may switch from the first state to the second state. The highest point of the pushing element 12 is lower than the lowest point of the object and may avoid interference on the return path of the object.

When the return operation of the object is completed and it is required to push a next object by the pushing mechanism 100, the driving device 20 drives the position-changing device 10 to move forward. The pushing element 12 rotates towards a side of the counterweight block 126 under the own gravity of the pushing element 12, so as to switch from the second state to the first state and continue to push the object.

Therefore, through providing the counterweight block 126, the pushing element 12 may have a trend of maintaining in the first state. After providing avoidance for the return of the object, the pushing element 12 may automatically switch back to the first state, so as to push the next object, and to improve the pushing efficiency of the pushing mechanism 100, thereby improving the inspection efficiency of the inspection device.

It should be noted that the counterweight block 126 and the pushing element 12 may be an integrated structure, or may be fixedly connected to the pushing element 12 through a connecting device. When the counterweight block 126 and the pushing element 12 are an integrated structure, the counterweight block 126 and the pushing element 12 may be integrated through casting or forging, so as to reduce the assembly process. When the counterweight block 126 is connected to the pushing element 12 through the connecting device, the connecting device may be a bolt, a rivet, or a pin. When assembling, the counterweight block 126 is connected to the pushing element 12 through the connecting device. A weight of the counterweight block 126 may be adjusted as required, so that the pushing element 12 has a trend of maintaining in the first state when no external force is applied.

As shown in FIG. 6, optionally, the main plate 11 is provided with at least one positioning block 112. A positioning portion 120 is also provided on a side of the pushing element 12 opposite to the counterweight block 126. When the pushing element 12 is in the first state, the positioning portion 120 may abut against the positioning block 112.

Specifically, the positioning portion 120 is located on a side surface of the pushing element 12 and is opposite to the counterweight block 126. The positioning portion 120 is formed as an avoidance groove inwardly recessed on the side surface of the pushing element 12. The avoidance groove has a positioning surface. The positioning surface may abut against the positioning block 112. When the pushing element 12 is in the first state, under an action of the gravity of the counterweight block 126, the pushing element 12 has a trend of maintaining in the first state, that is, the pushing element 12 has a trend of rotating toward a side of the counterweight block 126. Through the positioning portion 120 abutting against the positioning block 112, the rotation of the pushing element 12 may be limited, so that the pushing element 12 maintains stable in the first state, thereby improving the pushing effect of the pushing element 12 to the object.

Figure 7:
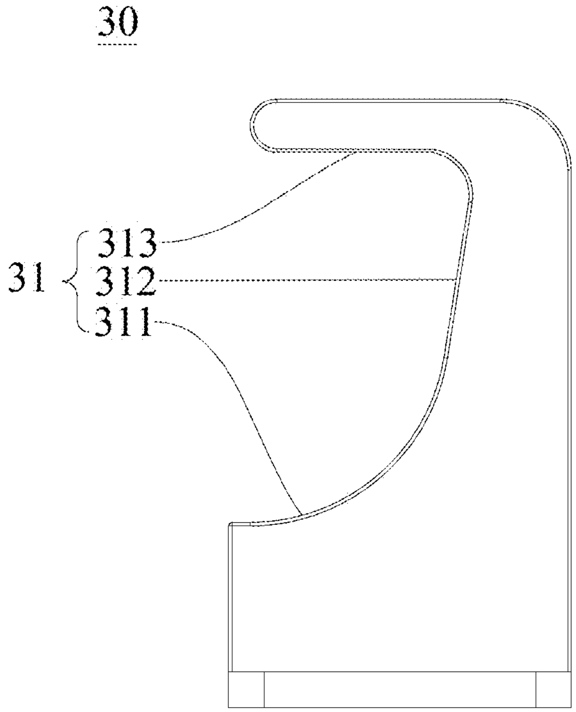
FIG. 7 is a main view of a guide device of a pushing mechanism of an embodiment of the present disclosure.

As shown in FIG. 7, in some embodiments, a surface of the guide groove 31 is a curved surface. The curved surface includes a lower section 311, a middle section 312 and an upper section 313 which are sequentially connected. A slope of the middle section 312 is greater than a slope of the lower section 311. An angle between the upper section 313 and the middle section 312 is less than or equal to 90 degrees. The slope of the lower section 311 gradually increases from bottom to top of the lower section 311.

Specifically, when the guide rod 121 on the pushing element 12 is in contact with the guide groove 31, the guide groove 31 may guide the movement of the guide rod 121. When the driving device 20 drives the position-changing device 10 to switch from the first state to the second state, the guide rod 121 is first in contact with the lower section 311 of the guide groove 31. The slope of the lower section 311 is small, and may provide a buffer for the guide rod 121 when the guide rod 121 is in contact with the surface of the guide groove 31, so as to prevent the surface of the guide groove 31 from being worn due to a collision when the guide rod 121 is in contact with the guide groove 31.

Next, the guide rod 121 gradually moves from the lower section 311 to the middle section 312 under the guiding of the guide groove 31. In a process of movement, the slope of the guide groove 31 continues to increase, which may allow the pushing element 12 to switch from the first state to the second state more quickly in a shorter itinerary, thereby improving the switching efficiency of the pushing element 12.

Finally, when the guide rod 121 moves to a joint of the upper section 313 of the guide groove 31 and the middle section 312 of the guide groove 31, the pushing element 12 is in the second state, and an angle between the upper section 313 and the middle section 312 may limit the position of the guide rod 121, so that the pushing element 12 maintains stable in the second state. The angle between the upper section 313 and the middle section 312 is less than or equal to 90 degrees, which may prevent the pushing element 12 from continuing to move along the guide groove 31 after switching to the second state.

Therefore, the switching efficiency of the pushing element 12 switching from the first state to the second state may be higher, and the pushing element 12 may be maintained stable in the second state.

Figure 8:
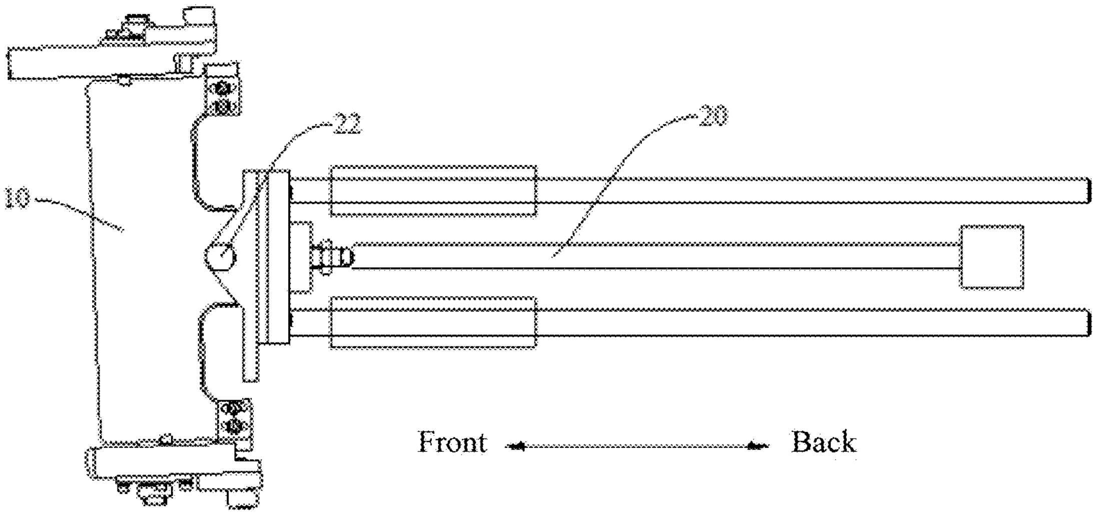
FIG. 8 is a top view of a partial structure of a pushing mechanism of an embodiment of the present disclosure.

As shown in FIG. 8, optionally, the driving device 20 and the main plate 11 are connected through a spherical joint.

Specifically, when the driving device 20 is connected to the main plate 11 through a spherical joint, one of the driving device 20 and the main plate 11 has a sphere, and the other one of the driving device 20 and the main plate 11 has a sphere shell. The sphere and the sphere shell are sealed together. Lubricating oil is inside the sphere shell. When the driving device 20 drives the position-changing device 10 to move, the sphere may rotate within a certain range in the sphere shell. As the pushing element 12 is located on a side of the main plate 11, the pushing element 12 may rotate within a certain range. Before the object is inspected by the inspection device, the object may be in an inclined state. If the object is inspected at this time, there will be large errors, which may not meet the requirements of inspection. Since the pushing element 12 may rotate within a certain range, through pushing the object by the pushing element 12, a posture of the object may be slightly corrected, so as to allow the object to be aligned, thereby meeting the requirements of inspection.

As a result, the inspection efficiency of the inspection device may be improved.

As shown in FIG. 3 and FIG. 8, in some embodiments, the driving device 20 and the main plate 11 are connected in an articulated manner. One of the driving device 20 and the main plate 11 is provided with a groove 21. The other one of the driving device 20 and the main plate 11 is provided with a plate-shaped portion 111 horizontally inserted into the groove 21. A pin 22 vertically passes through the groove 21 and the plate-shaped portion 111. An interval is provided between a front edge of the plate-shaped portion 111 and a rear of the groove 21. Through threading the pin 22 into the groove 21 and the plate-shaped portion 111, the driving device 20 may be connected to the main plate 11. Since the interval is provided between the front edge of the plate-shaped portion 111 and the rear of the groove 21, the main plate 11 may rotate relative to the driving device 20 in a horizontal direction, thereby slightly correcting the posture of the object.

As a result, the inspection efficiency of the inspection device may be improved.

It should be noted that there is no specific limitation on a dimension of the interval between the front edge of the plate-shaped portion 111 and the rear of the groove 21, which may be set according to actual requirements.

Preferably, the interval between the front edge of the plate-shaped portion 111 and the rear of the groove 21 is L, L=1 mm. Through disposing an interval of 1 mm, the position-changing device 10 may rotate by 2 degrees on a horizontal plane, which may improve the stability of the connection between the position-changing device 10 and the driving device 20 while correcting the posture of the object by the position-changing device 10.

In some embodiments, a mode of motion of the pushing element 12 from the first state to the second state is moving, rotating, or a combination of moving and rotating. There are no specific restrictions on the mode of motion of the pushing element 12 to switch between the first state and the second state. The pushing element 12 may switch between the first state and the second state by moving, rotating or a mode of combining the two. When different modes of motion are used by the pushing element 12, correspondingly, a mode of guiding of the guide device 30 to the pushing element 12 also needs to be adjusted accordingly.

Figure 9:
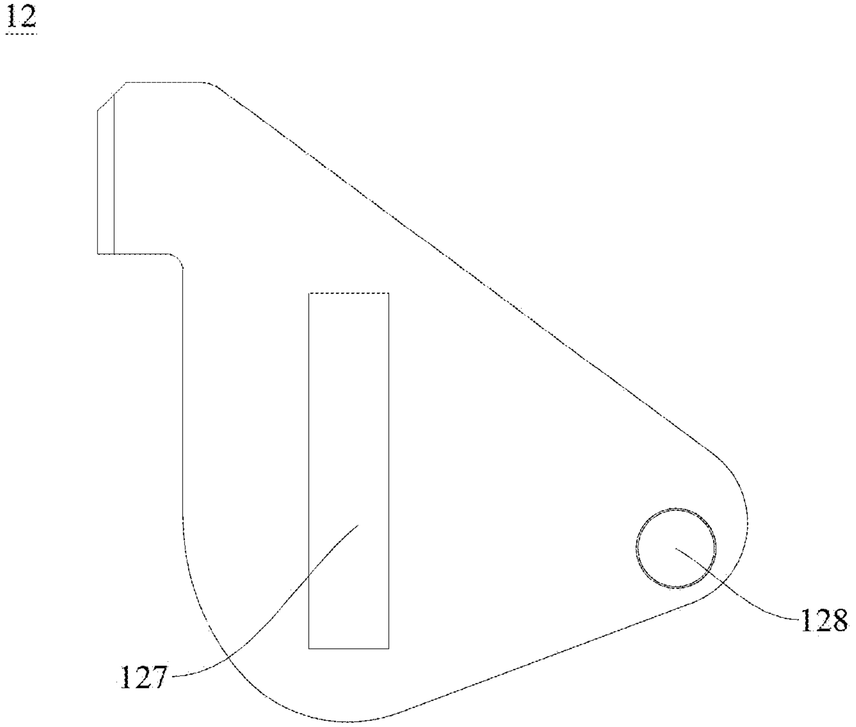
FIG. 9 is a main view of a pushing element of a pushing mechanism of a second embodiment of the present disclosure.
Figure 10:
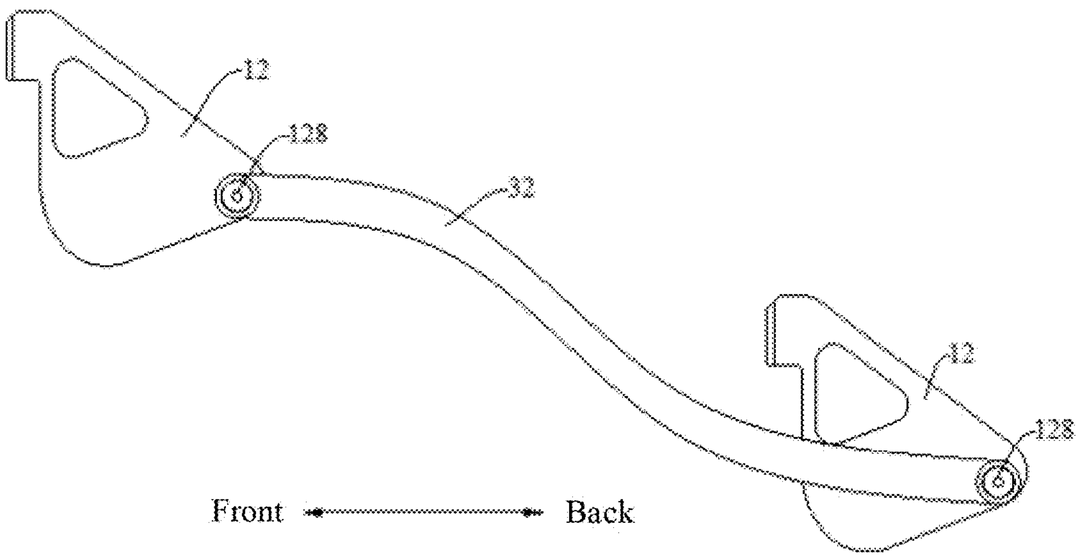
FIG. 10 is a schematic diagram of a pushing mechanism of a second embodiment of the present disclosure.

As shown in FIG. 9 and FIG. 10, according to the pushing mechanism of the second embodiment of the present disclosure, the pushing element 12 is movably connected to the main plate 11. The guide device 30 includes a slide rail 32 having a lifting and lowering stroke, and a slide block 128 slidable in the slide rail 32 is provided on the pushing element 12. The slide rail 32 is in contact with the slide block 128 in an upper surface of and a lower surface, and is configured to guide the slide block 128 to be lifted and lowered as moving along the slide rail 32.

Specifically, the pushing element 12 has a slide groove 127. The shaft 123 may slide up and down within the slide groove 127. The slide block 128 on the pushing element 12 may move within the slide rail 32 of the guide device 30, and the slide rail 32 may constrain the slide block 128 by the upper surface of the slide rail 32 and the lower surface of the slide rail 32. When the driving device 20 drives the position-changing device 10 to move, the pushing element 12 switches from the first state to the second state, the main plate 11 moves backwards under the driving of the driving device 20. The slide block 128 of the pushing element 12 may be lowered along the slide rail 32 under the constraint of the upper surface of the slide rail 32 and lower surface of the slide rail 32. Through the cooperation of the slide groove 127 and the shaft 123, the pushing element 12 may move downwards, thereby continuously reducing a height of the highest point of the pushing element 12. When the pushing element 12 is in the second state, the height of the highest point of the pushing element 12 is lower than a height of the lowest point of the object, thereby providing avoidance for the object.

Figure 11:
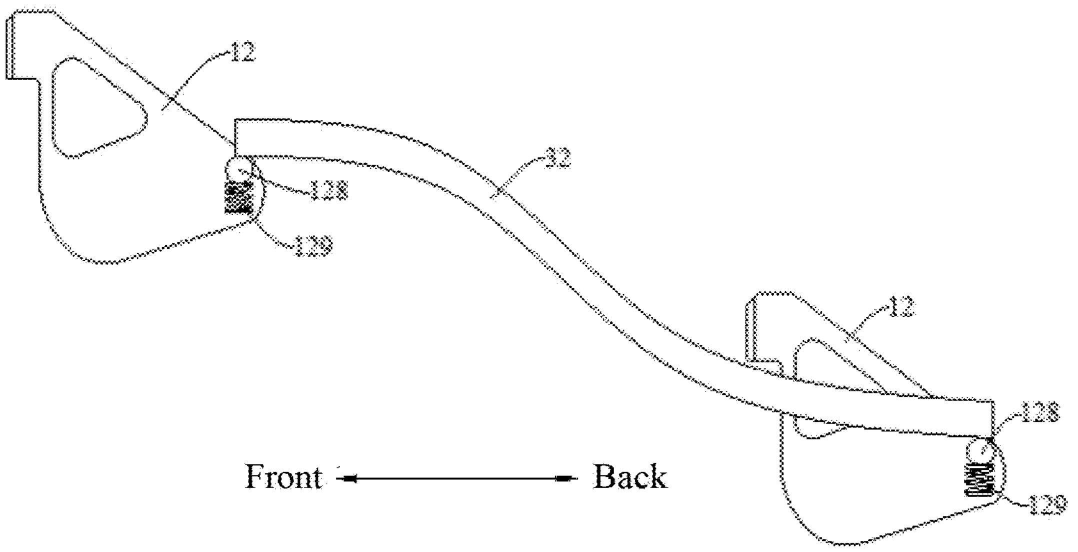
FIG. 11 is a schematic diagram of a pushing mechanism of a third embodiment of the present disclosure.

As shown in FIG. 9 and FIG. 11, according to a pushing mechanism of a third embodiment of the present disclosure, the pushing mechanism 12 is movably connected to the main plate 11. The guide device 30 includes a slide rail 32 having a lifting and lowering stroke. A slide block 128 slidable along the slide rail 32 is provided on the pushing element 12. The slide rail 32 is in contact with the upper surface of the slide block 128. The position-changing device 10 includes a reset element 129 configured to apply an upward force to the pushing element 12. Through a combined force of the slide rail 32 and the reset element 129, the slide block 128 is lifted and lowered as moving along the slide rail 32.

Specifically, the pushing element 12 has a slide groove 127. The shaft 123 may slide up and down within the slide groove 127. The slide block 128 on the pushing element 12 may move along the slide rail 32 of the guide device 30, through the force of the reset element 129 to the pushing element 12, the slide block 128 of the pushing element 12 is allowed to be maintained in contact with the upper surface of the slide rail 32. The driving device 20 drives the position-changing device 10 to move, the pushing element 12 is allowed to switch from the first state to the second state, and the main plate 11 is driven to move backwards under the driving of the driving device 20. The slide block 128 of the pushing element 12 may be closely pressed to the upper surface of the slide rail 32 and be lowered. Through the cooperation of the slide groove 127 and the shaft 123, the pushing element 12 may move downwards, thereby continuously reducing the height of the highest point of the pushing element 12. When the pushing element 12 is in the second state, the height of the highest point of the pushing element 12 is lower than the height of the lowest point of the object, thereby providing avoidance for the object.

According to the inspection system of the second embodiment of the present disclosure, the inspection system includes: a pushing mechanism 100 as described in any of the above embodiments, a conveying mechanism and an inspection mechanism. The pushing mechanism 100 may push the object on the conveying mechanism to an inspection position. The inspection mechanism is configured to inspect the object at the inspection position.

According to the inspection system of the second embodiment of the present disclosure, by disposing the above-mentioned pushing mechanism 100 in the inspection system, the object may be returned by the conveying mechanism after the inspection of the object fails. The pushing mechanism 100 may avoid interference on the return path of the object, thereby improving the inspection efficiency of the inspection system.

In the description of the specification, the reference terms "embodiment", "example", etc. refer to specific features, structures, materials, or characteristics described in conjunction with the embodiment or example, which are included in at least one embodiment or example of the present disclosure. In the specification, the illustrative expressions of the above terms may not necessarily refer to same embodiments or examples. Moreover, the specific features, structures, materials, or characteristics described may be combined in an appropriate manner in any one or more embodiments or examples.

Although the embodiments of the present disclosure have been shown and described, those of skill in the art may understand that various changes, modifications, substitutions and variations may be made to these embodiments without departing from principles and purposes of the present disclosure, and the scope of the present disclosure is limited by the claims and their equivalents.

What is claimed is:

1. A pushing mechanism comprising:

a position-changing device comprising a main plate and a pushing element movably disposed on a side of the main plate;

a driving device connected to the main plate and configured to drive the position-changing device to move;

a guide device, wherein after the guide device is in contact with the pushing element, the pushing element is allowed to switch between a first state and a second state;

wherein a highest point of the pushing element in the first state is higher than a highest point of the pushing element in the second state, wherein the pushing element is rotatably connected to the main plate through a shaft, the pushing element comprises a first edge and a first corner adjacent to the first edge, and a distance between the first corner and the shaft is greater than a vertical distance between the first edge and the shaft, wherein a counterweight block is provided on the pushing element, and the counterweight block and the first corner are located on two sides of an axis of the shaft in a horizontal direction respectively, so that the pushing element has a trend of maintaining in the first state, wherein the guide device comprises a guide groove, a surface of the guide groove is a curved surface, wherein the curved surface comprises a lower section, a middle section and an upper section which are sequentially connected, a slope of the middle section is greater than a slope of the lower section, an angle between the upper section and the middle section is less than or equal to 90 degrees, and the slope of the lower section gradually increases from bottom to top of the lower section.

2. The pushing mechanism of claim 1, wherein a mode of motion of the pushing element switching from the first state to the second state is moving, rotating, or a combination of moving and rotating.

3. The pushing mechanism of claim 1, wherein a guide rod is provided on the pushing element, and the guide rod drives the pushing element to move under a guiding of the guide groove.

4. The pushing mechanism of claim 1, wherein a positioning block is provided on the main plate, a positioning portion is provided on a side surface opposite to the counterweight block on the pushing element, and when the pushing element is in the first state, the positioning portion abuts against the positioning block.

5. The pushing mechanism of claim 1, wherein the driving device and the main plate are connected in an articulated manner.

6. The pushing mechanism of claim 5, wherein the driving device and the main plate are connected through a spherical joint.

7. The pushing mechanism of claim 5, wherein one of the driving device and the main plate is provided with a groove, the other one of the driving device and the main plate is provided with a plate-shaped portion horizontally inserted into the groove, and a pin vertically passes through the groove and the plate-shaped portion, wherein an interval is provided between a front edge of the plate-shaped portion and a rear of the groove.

8. The pushing mechanism of claim 2, wherein the pushing element is movably connected to the main plate.

9. The pushing mechanism of claim 8, wherein the guide device comprises a slide rail having a lifting and lowering stroke, and a slide block slidable along the slide rail is provided on the pushing element.

10. The pushing mechanism of claim 9, wherein the slide rail is in contact with the slide block in an upper surface and a lower surface, and is configured to guide the slide block to be lifted and lowered as moving along the slide rail.

11. The pushing mechanism of claim 9, wherein the slide rail is in contact with an upper surface of the slide block, and the position-changing device comprises a reset element configured to apply an upward force to the pushing element, so that the slide block is lifted and lowered as moving along the slide rail through a combined force of the slide rail and the reset element.

12. An inspection system comprising a pushing mechanism of claim 1, a conveying mechanism and an inspection mechanism, wherein the pushing mechanism pushes an object on the conveying mechanism to an inspection position, and the inspection mechanism is configured to inspect the object at the inspection position.

* * * * *